United States Patent [19]

Shackleford et al.

[11] 4,119,929
[45] Oct. 10, 1978

[54] NEAR INFRARED LASER MODULATOR

[75] Inventors: William L. Shackleford, Seal Beach; Donald C. Winter, Manhattan Beach; David B. Hall, Hollywood, all of Calif.

[73] Assignee: TRW Inc., Redondo Beach, Calif.

[21] Appl. No.: 798,739

[22] Filed: May 19, 1977

[51] Int. Cl.² ............................................. H01S 3/10
[52] U.S. Cl. ...................... 331/94.5 M; 331/94.5 D; 350/356
[58] Field of Search .................... 331/94.5 C, 94.5 M, 331/94.5 Q, 94.5 D; 350/356

[56] References Cited

U.S. PATENT DOCUMENTS

| 3,702,724 | 11/1972 | Land et al. | 350/356 |
|---|---|---|---|
| 3,990,770 | 11/1976 | Carl et al. | 350/356 |
| 3,998,523 | 12/1976 | Otomo | 350/356 |

Primary Examiner—William L. Sikes

Attorney, Agent, or Firm—Edwin A. Oser; John J. Connors

[57] ABSTRACT

A modulator for a laser such as a chemical or electrically excited laser radiating in the region between approximately 2 and approximately 5 microns. The modulator consists of a transparent ferroelectric ceramic of the type known as PLZT. Such a polycrystal is disposed in the laser cavity. An electric voltage is applied to the crystal for causing it to exhibit optical birefringence, thus spoiling the Q of the laser cavity. Further, means is disposed in the laser cavity for linearly polarizing the radiation such as one or more Brewster windows transparent to the radiation. The crystal is cooled by fluid means such as a gas transparent to the radiation. Further, the crystal is mounted by means having an acoustic impedance substantially matching that of the crystal so that mechanical stress waves set up in the crystal are not reflected back into the crystal.

5 Claims, 4 Drawing Figures

NEAR INFRARED LASER MODULATOR

BACKGROUND OF THE INVENTION

This invention relates generally to lasers and more particularly relates to a modulator for a chemical laser radiating in the wavelength region between 2 and 5 microns (micrometers).

Chemical and electrically excited lasers utilizing HF, DF and CO as the laserable material are well known. They radiate in the infrared between approximately 2 and approximately 5 microns. It is frequently desired to modulate the output of such a laser which is often a continuous wave (CW) laser. Particularly in cases where a high and rapidly variable modulation rate is desirable, mechanical modulation is either impractical or impossible.

For this reason an electro-optical modulator would be highly desirable. Such electro-optical modulators include the recently developed transparent ferroelectric ceramics. Among these ceramics is the lanthanum modified lead zirconate titanate (PLZT) system. It is sometimes referred to as a quaternary $(Pb,La)(Zr,Ti)O_3$. Such PLZT ceramics may have the following formula:

$$Pb_{1-x}La_x(Zr_yTi_z)_{1-x/4}O_3 \qquad (1)$$

An alternate formula is as follows:

$$Pb_{1-3x/2}La_x(Zr_yTi_z)O_3 \qquad (2)$$

However, such PLZT polycrystals do not normally withstand the high radiation present in the cavity of a chemical laser. Such radiation might, among other things, heat up the crystal, shatter it or otherwise render it inoperative.

It is therefore an object of the present invention to provide an electro-optical modulator for a high power laser radiating in the wavelength region between approximately 2 and approximately 5 microns.

Another object of the present invention is to cool such a polycrystal so as to prevent it from heating up.

A further object of the present invention is to mount the crystal in such a way that the acoustic impedance of the holder substanitially matches that of the crystal so that mechanical stress waves set up in the crystal are critically damped, that is that they are substantiallly prevented from reflecting back into the crystal.

SUMMARY OF THE INVENTION

In accordance with the present invention there is provided a conventional laser which may, for example, be an HF, DF or CO laser radiating between approximately 2 and 5 microns that is in the near infrared. The laser includes the usual laser cavity. A linear polarizer is disposed in the laser cavity for linearly polarizing the radiation. This may, for example, consist of one or more Brewster windows.

Further, a PLZT polycrystal is also disposed in the laser cavity. Means are provided for applying at will an electric voltage to the crystal for causing optical birefringence. This will provide effectively a Q spoiler. Hence, when the crystal becomes sufficiently birefringent the laser ceases to lase. The duty cycle and repetition frequency can be controlled by the voltage applied to the crystal.

In order to maintain the crystal at a relatively low temperature it is cooled by fluid means transparent to the radiation. This may, for example, consist of a gas stream such as nitrogen transparent to the radiation.

Furthermore, the laser is preferably mounted by means such as a holder having an acoustic impedance substantially matching that of the crystal. Accordingly, mechanical stress waves set up in the crystal by energizing it by an applied voltage are substantially not reflected back into the crystal.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

DESCRIPTION OF THE PREFERRED EMBODIMENT

Figure 1:
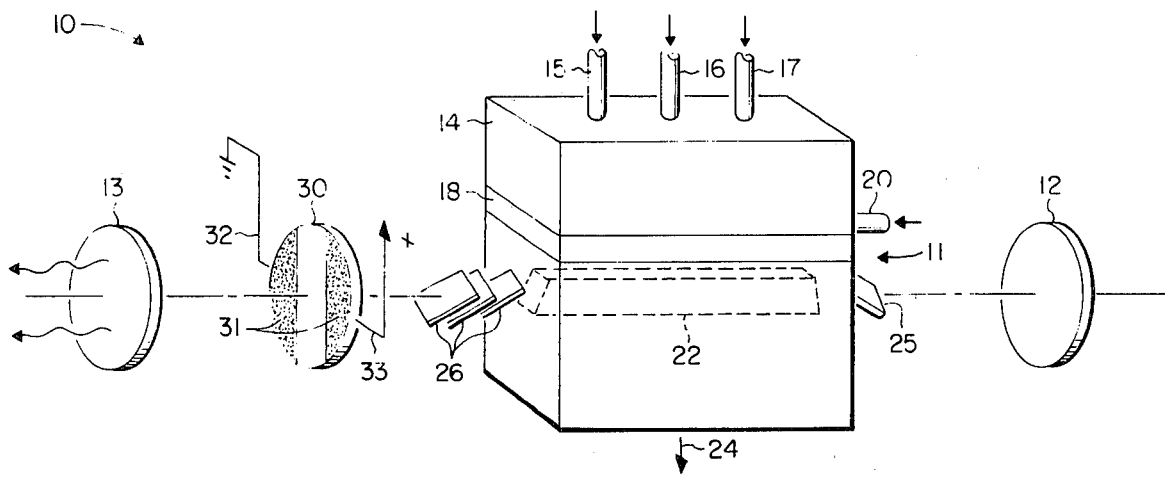
FIG. 1 is a somewhat schematic view in perspective of a conventional chemical laser provided with a modulator of the present invention.

Referring now to FIG. 1, there is schematically illustrated a generally conventional chemical laser generally designated 10. It will be understood that other types of infrared lasers such as electrically energized lasers may be used instead. The laser includes a laser cavity 11 which is defined by a totally reflecting mirror 12 and a partially reflecting mirror 13. The mirror 13 may, for example, transmit on the order of 10% of the radiation.

The chemical laser 10 has a combustor chamber 14 into which an oxidizer is introduced by the inlet 15, a fuel by the inlet 16 and a diluent by the inlet 17. The combustor 14 is followed by a cavity injector 18 into which the cavity fuel is introduced by an inlet 20. The chemical reaction takes place in a following gain region 22, designated by dotted lines, from which the reaction products exit through an exhaust 24 as indicated by the arrow.

In order to linearly polarize the radiation created in the laser cavity 11, that is between the two mirrors 12 and 13, there is provided in the laser cavity a linear polarizer. In accordance with the present invention this may consist, for example, of a Brewster window 25 to the right of the gain region 22 and, for example, 3 Brewster windows 26 to the left of this region. The Brewster windows must be transparent to the laser radiation and may, for example, consist of $CaF_2$ (calcium fluoride).

In order to spoil the Q of the laser which causes it to cease lasing there is provided in accordance with the present invention a transparent ferroelectric ceramic consisting of PLZT. This material becomes optically birefringent when an electric voltage is applied thereto. It has been found that the lanthanum oxide forming part of the PLZT when present in a certain amount substantially increases the optical transparency. This is particularly so when antireflection coatings are provided. These are multilayer dielectric coatings which minimize reflection from the surface of the crystal. Preferably a PLZT is selected having about 9% lanthanum with a ratio of zirconium atoms to titanium atoms of 65 to 35. Such a material may require a voltage of 10-15 kv per centimeter with a thickness of the crystal of 1 mm. These materials are commercially available from Motorola Inc. Communications Division.

Accordingly, as shown in FIG. 1, there is provided a polycrystal 30 of PLZT which may have the composition above referred to. The crystal is provided with a coating 31 on both sides which is electrically conductive. The thus formed electrode consists preferably of a chromium - gold coating having electric wires 32 and 33 attached thereto. Wire 32 may be connected to ground as shown while wire 33 may be periodically connected to a positive high voltage supply as will be later explained in connection with FIG. 4. The modulation frequency may, for example, be between 100 and 2,000 hz with duty cycles between 20% and 80%. As shown more clearly in FIG. 2, a clear space 34 is formed between the electrodes 31 and this should correspond to the area of the gain region 22. In other words, the clear area should be large enough to accommodate the laser beam and to provide a large aperture. By way of example, the crystal 30 may have a diameter of 3.8 centimeters with a clear strip 34 of 1.65 centimeter wide to accommodate the laser beam. The thickness of crystal 30 may, for example, be 1 millimeter. Since PLZT has a high dielectric constant on the order of 5,000 it tends to confine the electric field lines within the crystal and hence minimizes electrostatic fringing.

Figure 3:
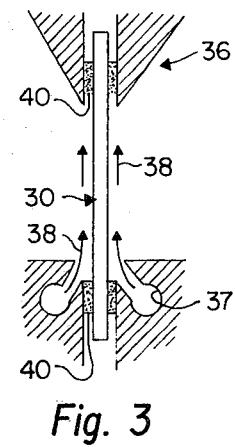
FIG. 3 is a side elevational view of a crystal in its holder including a plenum for the cooled gas.

In accordance with the present invention the crystal is mounted in a holder 36 as shown in FIG. 3. The holder is provided with a plenum 37 on one half of the holder to issue a coolant fluid medium which moves along the crystal as shown by the arrows 38. This fluid medium may consist of a gas transparent to the radiation such, for example, as clean nitrogen ($N_2$). The gas flow should be sufficient to effectively cool the crystal, thus preventing damage, excessive distortion or loss of birefringence.

In addition the holder 36 is provided with two pairs of viscoelastic mounting pads 40 provided on both sides of the crystal 30. As pointed out before, this material should match the acoustic impedance of the crystal. When the crystal is energized by applying a high voltage thereto mechanical stress waves are set up. The purpose of the mounting pads 40 is to minimize or substantially eliminate the reflection of these acoustic stress waves. By way of example, the mounting pads 40 may consist of Apiezon Q which is a putty-like material available in the trade. Basically the mounting pads provide critical damping for the stress waves.

Figure 2:
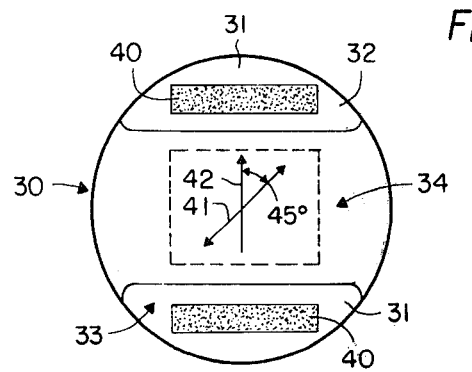
FIG. 2 is a front elevational view of the PLZT polycrystal showing its electrodes and two mounting pads for matching the acoustic impedance of the crystal.

When properly mounted in the holder disclosed in connection with FIGS. 2 and 3, the crystal can operate with a radiation flux as high as 4,000 W/square centimeter corresponding to a laser power output of approximately 200 W. Preferably, the plane of polarization of the laser as controlled by the Brewster windows 25, 26 and as shown by arrow 41 (in FIG. 2) is at an angle of 45° to the electric field of the modulator as represented by the arrow 42 of FIG. 2. This can be readily achieved by rotating the Brewster windows 25 and 26 about the optical axis of the laser. The thickness of the crystal 30 may be on the order of 1 millimeter. This requires an electric voltage of between 10 and 15 kv per centimeter.

The thickness of the crystal is selected so that it is not too thick to absorb too much of the radiation which would reduce the power output. On the other hand, it is sufficiently thick that it can be operated at a relatively low voltage.

Figure 4:
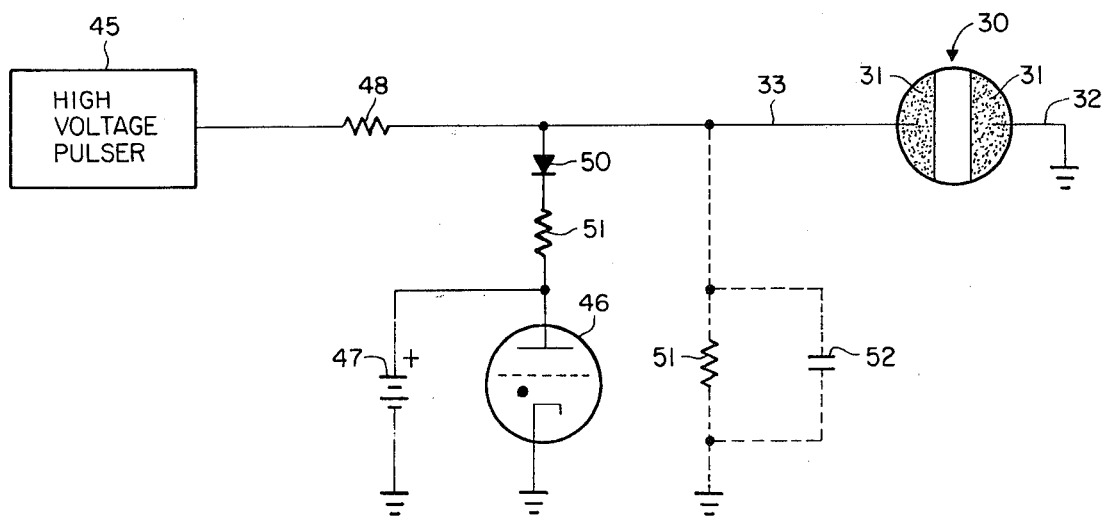
FIG. 4 is a circuit diagram of the means for applying periodically a high voltage to the crystal so as to render it birefringent.

The electric voltage may be applied with the circuit of FIG. 4. This consists of a high voltage pulser 45 which may be periodically grounded by a thyratron 46, the anode of which is supplied by a high positive voltage by the battery 47. A resistor 48 is connected by the pulser 45 and the lead 33 to the electrode 31 of the crystal 30. The thyratron 46 is operated by the diode 50 and resistor 51 connected in series with the anode of the thyratron and the input lead 33 of the crystal 30. This will rapidly discharge the positive voltage applied to the electrode 31.

The crystal 30 appears electrically as a resistor 51 in parallel with a capacitor 52 both being connected to ground. The resistance of the resistor 51 may amount to 108 ohms and the capacitance of the capacitor 52 to 200 picofarads.

There has thus been disclosed an electro-optical modulator for a high power laser radiating in the region between 2 and 5 microns. The modulator can be electrically operated at relatively high frequencies and with different duty cycles depending on the need. The modulator consists basically of a PLZT crystal. The crystal is cooled by a clean fluid medium such as a gas transparent to the laser radiation. It is also mounted by a material having an acoustic impedance matching that of the crystal to minimize the reflection of mechanical stress waves. This, of course, will minimize jitter of the laser output.

What is claimed is:

1. A laser for generating radiation in the wavelength region between approximately 2 and approximately 5 microns, said laser comprising:
   (a) a laserable material;
   (b) means for exciting the laserable material and causing a population inversion;
   (c) means providing a laser cavity;
   (d) means disposed in said laser cavity for linearly polarizing the radiation generated by the excited laserable material;
   (e) a PLZT polycrystal disposed in said laser cavity;
   (f) means for applying at will an electric voltage to said PLZT crystal for causing optical birefringence, thereby to modulate the laser output; and
   (g) fluid means disposed about said crystal and transparent to the radiation generated by the laser for cooling said crystal.

2. A laser as defined in claim 1 wherein said transparent fluid consists of an inert gas.

3. A laser as defined in claim 2 wherein said gas consists of nitrogen.

4. A laser as defined in claim 1 wherein means is provided for mounting said crystal, said means having an acousting impedance substantially matching that of said crystal whereby mechanical stress waves set up in said crystal are substantially not reflected back from said means for mounting into said crystal.

5. A laser as defined in claim 1 wherein said means for polarizing the radiation of said laser consists of a plurality of Brewster windows disposed in said cavity.

* * * * *